United States Patent
Iriyama

(10) Patent No.: US 9,046,045 B2
(45) Date of Patent: Jun. 2, 2015

(54) OUTPUT CONTROL DEVICE FOR INTERNAL COMBUSTION ENGINE AND OUTPUT CONTROL METHOD FOR INTERNAL COMBUSTION ENGINE

(75) Inventor: Masahiro Iriyama, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 359 days.

(21) Appl. No.: 13/640,956

(22) PCT Filed: Apr. 12, 2011

(86) PCT No.: PCT/JP2011/059084
§ 371 (c)(1),
(2), (4) Date: Oct. 23, 2012

(87) PCT Pub. No.: WO2011/129327
PCT Pub. Date: Oct. 20, 2011

(65) Prior Publication Data
US 2013/0030676 A1  Jan. 31, 2013

(30) Foreign Application Priority Data
Apr. 13, 2010 (JP) ................. P2010-092172

(51) Int. Cl.
*F02D 29/02* (2006.01)
*B60T 13/52* (2006.01)
*B60T 17/02* (2006.01)
(Continued)

(52) U.S. Cl.
CPC .......... *F02D 29/02* (2013.01); *F02M 35/10229* (2013.01); *F02D 11/105* (2013.01); *F02D 11/107* (2013.01); *F02D 2200/602* (2013.01); *F02D 2250/26* (2013.01); *F02N 2200/102* (2013.01); *B60T 13/52* (2013.01); *B60T 17/02* (2013.01); *B60T 17/22* (2013.01)

(58) Field of Classification Search
CPC .............................. F02D 29/02; F02D 11/105
USPC .................. 701/48, 54, 62, 76, 84, 101, 102; 123/492, 493
See application file for complete search history.

(56) References Cited

U.S. PATENT DOCUMENTS 5,607,209 A * 3/1997 Narita et al. ............. 303/122.11
6,125,315 A   9/2000 Kon et al.
(Continued)

FOREIGN PATENT DOCUMENTS

JP    7-139383 A    5/1995
JP   11-050875 A    2/1999
(Continued)

OTHER PUBLICATIONS

Russian Decision on Grant dated Apr. 1, 2014 (9 pgs.).
(Continued)

*Primary Examiner* — Mahmoud Gimie
(74) *Attorney, Agent, or Firm* — Foley & Lardner LLP

(57) ABSTRACT

The present invention concerns an output control device for an internal combustion engine for generating a drive force of a vehicle. The output control device includes a braking request detection sensor for detecting whether or not a braking request operation has been performed, and a controller programmed to calculate a braking operation time from the start of the braking request operation, and limit an output of the internal combustion engine when the braking operation time becomes longer than a predetermined time.

5 Claims, 12 Drawing Sheets

(51) Int. Cl.
B60T 17/22 (2006.01)
*F02D 11/10* (2006.01)
*F02M 35/10* (2006.01)

(56) References Cited

U.S. PATENT DOCUMENTS

| | | |
|---|---|---|
| 6,463,896 B1 | 10/2002 | Fujiwara et al. |
| 7,381,146 B2 | 6/2008 | Gouda et al. |
| 8,392,052 B2 | 3/2013 | Takeda |
| 2001/0020800 A1* | 9/2001 | Isono et al. ............... 303/113.1 |
| 2007/0150118 A1 | 6/2007 | Takamatsu et al. |
| 2007/0169007 A1 | 7/2007 | Hashimoto et al. |
| 2010/0036566 A1 | 2/2010 | Hayami |

FOREIGN PATENT DOCUMENTS

| | | |
|---|---|---|
| JP | 11-148396 A | 6/1999 |
| JP | 11-148407 A | 6/1999 |
| JP | 11-182274 A | 7/1999 |
| JP | 2005-291030 A | 10/2005 |
| JP | 2009-250071 A | 10/2009 |
| JP | 2010-038051 A | 2/2010 |
| RU | 2 329 170 C2 | 7/2008 |
| RU | 2 338 653 C2 | 11/2008 |

OTHER PUBLICATIONS

U.S. Appl. No. 13/640,960, filed Oct. 23, 2012, Iriyama.
M. Iriyama, USPTO Notice of Allowance U.S. Appl. No. 13/640,960 dated Oct. 15, 2014, 10 pgs.

* cited by examiner

OUTPUT CONTROL DEVICE FOR INTERNAL COMBUSTION ENGINE AND OUTPUT CONTROL METHOD FOR INTERNAL COMBUSTION ENGINE

FIELD OF THE INVENTION

The present invention relates to an output control device for an internal combustion engine and an output control method for an internal combustion engine.

BACKGROUND

Even if there is a certain trouble with an accelerator pedal, e.g. if a driver lays down a floor mat anew and the accelerator pedal should be caught by the newly laid floor mat and cannot be returned from a depressed state by any chance, a vehicle is required to be able to be stopped if a brake pedal is depressed.

Thus, JPH11-148396A discloses to limit an opening of a throttle valve when the operation amount of an accelerator pedal is kept substantially constant for a predetermined time or longer and a brake pedal is depressed.

When driving a vehicle, a driver generally depresses the accelerator pedal and the brake pedal in a distinguishing manner with the right foot. Some drivers may depress the brake pedal with the left foot while depressing the accelerator pedal with the right foot depending on the situation. Thus, the opening of the throttle valve is limited after discriminating whether the driver is intentionally depressing the brake pedal with the left foot or depressing the brake pedal due to a certain trouble having occurred to the accelerator pedal.

SUMMARY

However, even if the driver is intentionally depressing the brake pedal with the left foot, a case where the operation amount of the accelerator pedal is kept substantially constant for a predetermined time or longer is also conceivable. In that case, if the opening of the throttle valve is limited when the brake pedal is depressed, there has been a problem that a feeling of deceleration more than anticipated is given to the driver and driving performance is deteriorated.

The present invention was developed in view of such a problem and an object thereof is to suppress the deterioration of driving performance when a brake pedal is intentionally depressed while an accelerator pedal is being operated and enable a vehicle to stop through the depression of the brake pedal when there is a trouble with the accelerator pedal by any chance.

To achieve the above object, the present invention is directed to an output control device for an internal combustion engine for generating a drive force of a vehicle, including a braking request detection sensor for detecting whether or not a braking request operation has been performed; and a controller programmed to calculate a braking operation time from the start of the braking request operation and limit an output of the internal combustion engine when the braking operation time becomes longer than a predetermined time.

Embodiments and advantages of the present invention are described in detail below with reference to the accompanying drawings.

DETAILED DESCRIPTION

Hereinafter, one embodiment of the present invention is described with reference to the drawings and the like.

First Embodiment

Figure 1:
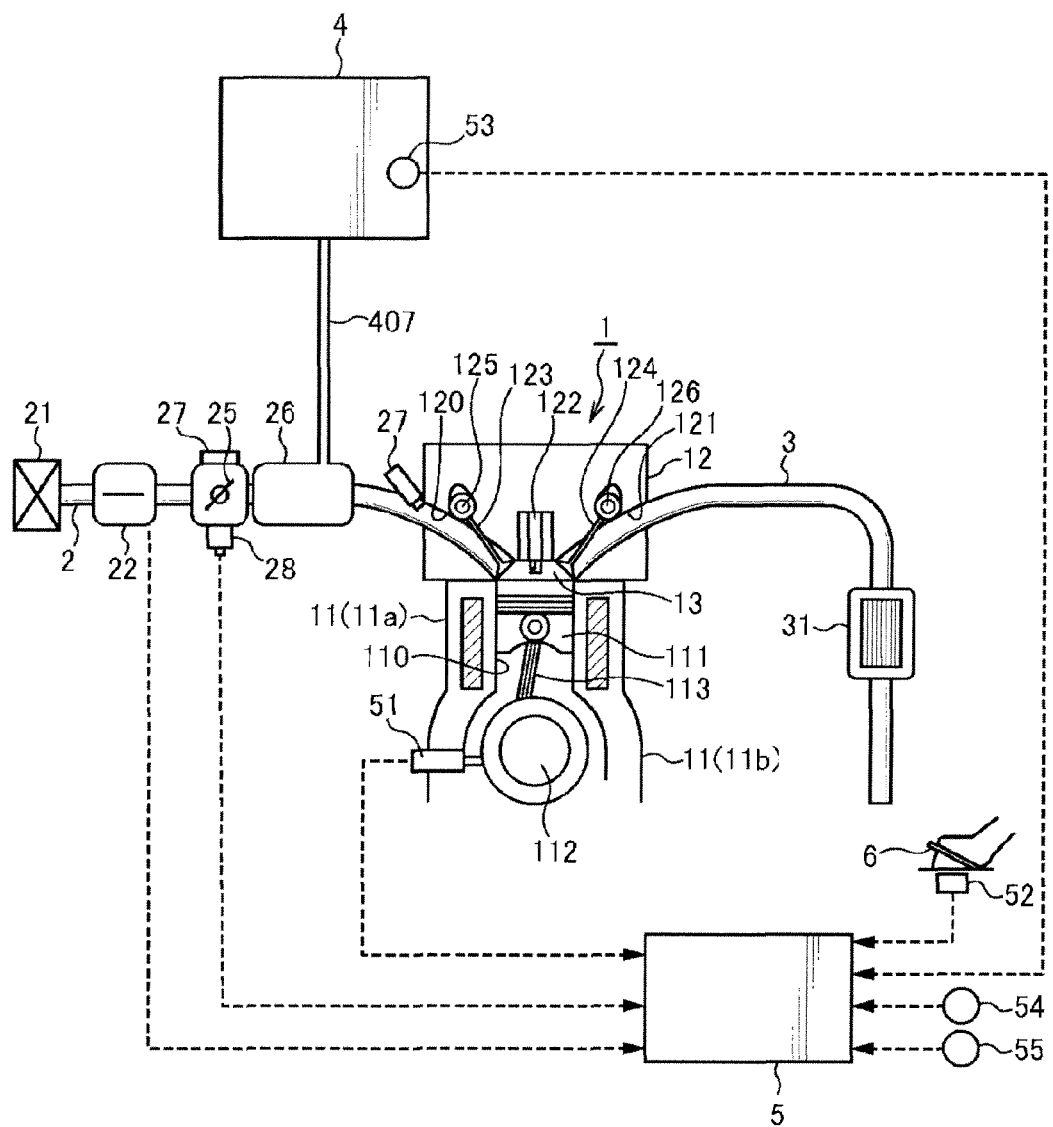
FIG. 1 is a schematic configuration diagram of a control device for a vehicle.

FIG. 1 is a schematic configuration diagram of a control device for a vehicle according to a first embodiment of the present invention.

The control device for the vehicle includes an engine 1 which generates a drive force of the vehicle, an intake passage 2 in which air to be sucked into the engine 1 (hereinafter, referred to as "intake air") flows, an exhaust passage 3 in which combustion gas exhausted from the engine 1 (hereinafter, referred to as "exhaust air") flows, a braking device 4 which brakes the vehicle and a controller 5.

The engine 1 includes a cylinder block 11 and a cylinder head 12.

The cylinder block 11 includes a cylinder part 11a and a crank case part 11b.

A plurality of cylinders 110 are formed in the cylinder part 11a. A piston 111 which reciprocatingly moves in the cylinder 110 upon receiving a combustion pressure is housed in each cylinder 110.

The crank case part 11b is formed below the cylinder part 11a. The crank case part 11b rotatably supports a crankshaft 112. The crankshaft 112 translates reciprocating motions of the pistons 111 into a rotational motion via a conrod 113.

The cylinder head 12 is mounted on the upper surface of the cylinder block 11 and forms a part of a combustion chamber 13 together with the cylinders 110 and the pistons 111.

The cylinder head 12 is formed with intake ports 120 which are connected to the intake passage 2 and open in the top wall of the combustion chamber 13 and exhaust ports 121 which are connected to the exhaust passage 3 and open in the top wall of the combustion chamber 13, and ignition plugs 122 are provided to be located in the center of the top wall of the combustion chamber 13. Further, the cylinder head 12 includes intake valves 123 which open and close openings between the combustion chamber 13 and the intake ports 120 and exhaust valves 124 which open and close openings between the combustion chamber 13 and the exhaust ports 121. Furthermore, the cylinder head 12 includes an intake camshaft 125 for drivingly opening and closing the intake valves 123 and an exhaust camshaft 126 for drivingly opening and closing the exhaust valves 124.

An air cleaner 21, an air flow meter 22, an electronically controlled throttle valve 25, an intake air collector 26 and fuel injection valves 27 are provided in this order from an upstream side in the intake passage 2.

The air cleaner 21 removes foreign substances such as sand included in the intake air.

The air flow meter 22 detects the flow rate of the intake air (hereinafter, referred to as an "intake air amount").

The throttle valve 25 adjusts the amount of the intake air flowing into the intake air collector 26 by changing a passage cross-sectional area of the intake passage 2. The throttle valve 25 is drivingly opened and closed by a throttle actuator 27 and an opening thereof (hereinafter, referred to as a "throttle opening") is detected by a throttle sensor 28.

The intake air collector 26 equally distributes the flowed-in air to each cylinder 110.

The fuel injection valve 27 injects fuel toward the intake port 120 according to an operating state of the engine 1.

A three-way catalyst 31 for removing toxic substances such as hydrocarbons and nitrogen oxides in the exhaust air is provided in the exhaust passage 3.

The braking device 4 is a device for generating a braking force necessary to decelerate decelerator or stop the vehicle. The braking device 4 is described with reference to FIG. 2.

Figure 2:
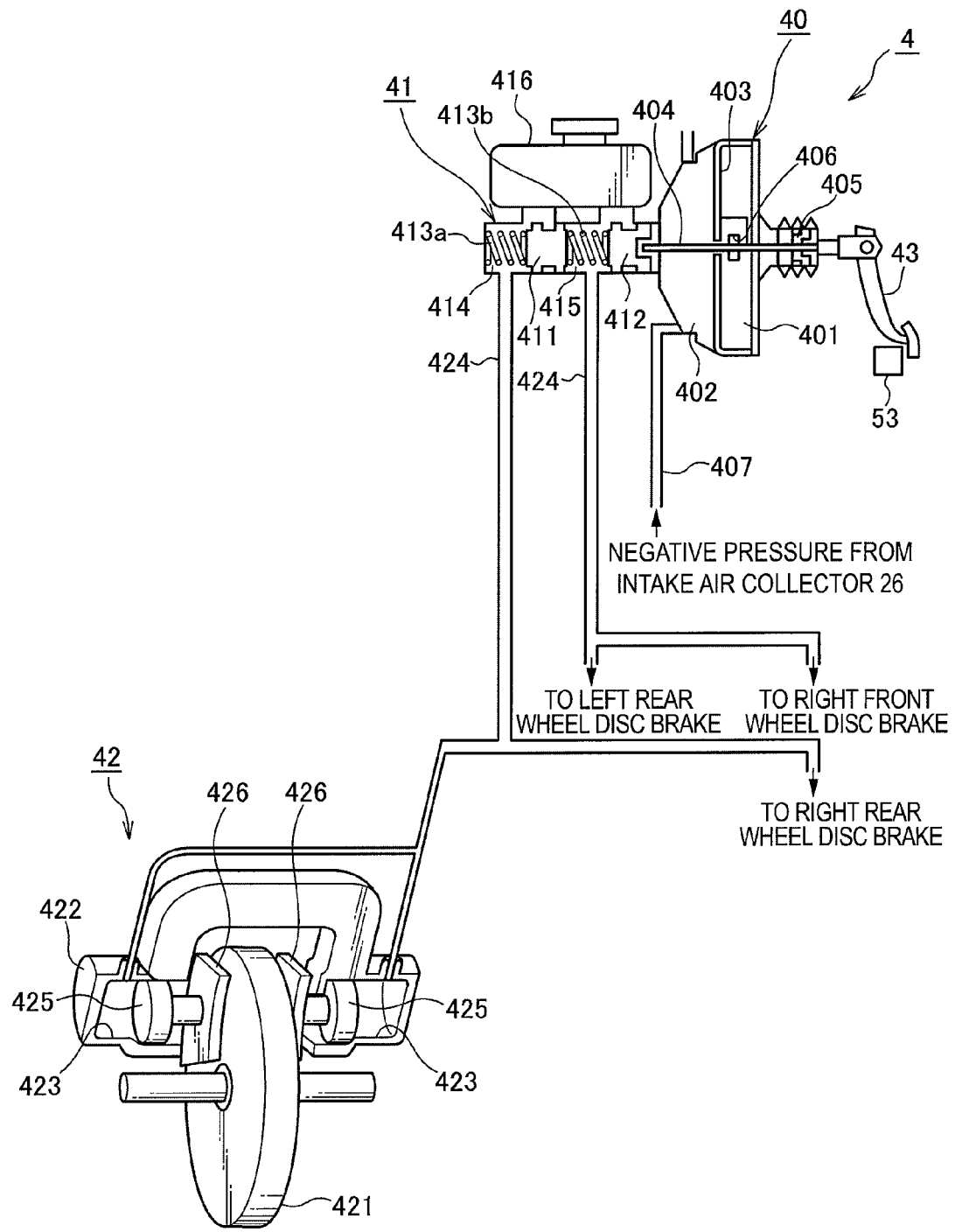
FIG. 2 is a schematic configuration diagram of a braking device.

FIG. 2 is a schematic configuration diagram of the braking device 4.

The braking device 4 includes a brake booster 40, a master cylinder 41, disc brakes 42 and a brake pedal 43.

The brake booster 40 is internally provided with a first chamber 401 and a second chamber 402 partitioned by a diaphragm 403 and a push rod 404, and reduces a force necessary to operate the brake pedal 43 utilizing a sucked negative pressure of the engine 1.

The first chamber 401 communicates with the atmosphere via a breather valve 405. The second chamber 402 communicates with the intake air collector 26 via a negative pressure pipe 407 and is in a negative pressure state. The first chamber 401 and the second chamber 402 communicate via a vacuum valve 406.

The push rod 404 penetrates through the interior of the brake booster 40. One end of the push rod 404 is connected to a second piston 412 of the master cylinder 41 and the other end is connected to the brake pedal 43. The push rod 404 moves to the left in FIG. 2 when the brake pedal 43 is depressed. This opens and closes the breather valve 405 and the vacuum valve 406 and a first piston 411 and the second piston 412 of the master cylinder 41 are pushed against return springs 413a, 413b, thereby generating a hydraulic pressure.

The master cylinder 41 includes the first and second pistons 411, 412 inside and generates a hydraulic pressure for operating the disc brakes 42.

The first piston 411 is supported from opposite sides by the return springs 413a, 413b. Parts where the return springs 413a, 413b are housed respectively form a first pressure chamber 414 and a second pressure chamber 415.

Each of the first pressure chamber 414 and the second pressure chamber 415 includes a supply port and a pressure feed port for brake fluid. The supply port communicates with a reservoir tank 416 to which the brake fluid is supplied. The pressure feed port communicates with a caliper 422 of the disc brake 42 for braking each wheel via hydraulic pipes 424. Only the disc brake 42 for braking the left front wheel is shown in FIG. 2 to avoid cumbersomeness.

The disc brake 42 includes a disc-shaped disc rotor 421 which rotates together with a rotary axis of the wheel, and the caliper 422 provided to sandwich the disc rotor 421.

Two cylinders 423 are provided at the opposite sides of the disc rotor 421 to face each other in the caliper 422. The cylinders 423 communicate with the master cylinder 41 via the hydraulic pipe 424. Further, pistons 425 which move in parallel to the rotary shaft of the wheel are housed in the cylinders 423, and brake pads 426 as friction members are provided at disc-rotor side ends of the pistons 425.

Next, functions of the braking device 42 are described.

The breather valve 405 of the brake booster 40 is closed when the brake pedal 43 is not depressed. On the other hand, the vacuum valve 406 is open. Accordingly, when the brake pedal 43 is not depressed, the first and second chambers 401, 402 are in a communicating state and pressures in the both are the same negative pressure.

When the brake pedal 43 is depressed in this state, the push rod 404 moves to the left in FIG. 2 and the vacuum valve 406 is first closed. This causes the first and second chambers 401, 402 not to communicate with each other.

When the brake pedal 43 is further depressed, the breather valve 405 is opened and atmospheric air is introduced into the first chamber 401. This causes the pressure in the first chamber 401 to be set at an atmospheric pressure. On the other hand, the pressure in the second chamber 402 remains to be the same negative pressure as that before the brake pedal 43 is depressed. Thus, there is a pressure difference between the first chamber 401 and the second chamber 402, and this differential pressure acts on the diaphragm 403 to serve as an assisting force in moving the push rod 404.

Further, when the brake pedal 43 is depressed, the push rod 404 moves to the left in FIG. 2 and the first and second pistons 411, 412 of the master cylinder 41 are pushed to the left in FIG. 2 against the return springs 413a, 413b to generate a hydraulic pressure. This hydraulic pressure acts on the pistons 425 of the calipers 422 via the hydraulic pipes 424 from the pressure feed port, whereby the pistons 425 move toward the disc rotors. This causes the brake pads 426 to be pressed against the disc rotors 421, thereby generating a braking force necessary to decelerate or stop the vehicle.

Referring back to FIG. 1 again, the control device of the vehicle is described.

The controller 5 is configured by a microcomputer including a central processing unit (CPU), a read only memory (ROM), a random access memory (RAM) and an input/output interface (I/O interface).

To the controller 5 are input detection signals from various sensors such as an engine rotation speed sensor 51 for detecting an engine rotation speed based on a crank angle, an accelerator stroke sensor 52 for detecting a depressed amount of the accelerator pedal 6 (hereinafter, referred to as an "accelerator operation amount"), a brake switch 53 for detecting whether or not the brake pedal 43 is depressed, a shift position detection sensor 54 for detecting the position of a shift lever and a vehicle speed sensor 55 for detecting a vehicle speed in addition to detection signals from the air flow meter 22 and the throttle sensor 28 described above.

The controller 5 optimally controls a throttle opening, a fuel injection amount, an ignition timing and the like according to an operating state based on the detection signals from these various sensors. Further, the controller 5 determines failures of each component and the sensors themselves based on the detection signals from these various sensors, and various fail-safes are carried out to ensure the safety of a driver as needed.

One of these fail-safes is, for example, to enable the vehicle to reliably decelerate and stop if the brake pedal 43 is depressed even if a driver lays down a floor mat anew and the accelerator pedal 6 should be caught by the newly laid floor mat and cannot be returned from a depressed state. This is specifically to limit an engine torque (throttle opening) lest a drive force of the vehicle should become larger than a braking force when the accelerator pedal 6 and the brake pedal 43 are both depressed.

However, a driver who enjoys sports driving may intentionally depress the brake pedal 43 with the left foot while depressing the accelerator pedal 6 with the right foot to improve turning performance of the vehicle such as at the time of cornering. Further, the brake pedal 43 may be intentionally depressed with the left foot while the accelerator pedal 6 is depressed with the right foot also when a fine speed adjustment is necessary. Further, it is also conceivable to inadvertently depress the brake pedal.

Thus, if the engine torque is constantly limited when the accelerator pedal 6 and the brake pedal 43 are both depressed, a feeling of deceleration more than intended may be given to the driver and driving performance is deteriorated. That is, it is not desirable to limit the engine torque by judging that a state is currently set where the accelerator pedal 6 cannot be returned only because the accelerator pedal 6 and the brake pedal 43 are both depressed.

Accordingly, in this embodiment, a target throttle opening is calculated based on an actual accelerator operation amount (hereinafter, referred to as an "actual accelerator operation amount") until a predetermined time elapses after the brake pedal 43 is depressed. This suppresses the deterioration of driving performance when the brake pedal 43 is intentionally depressed with the left foot. If the accelerator pedal 6 is depressed by a predetermined limit value (braking accelerator operation amount) or more despite the elapse of the predetermined time after the brake pedal 43 is depressed, the target throttle opening is calculated based on that limit value. Since the engine torque can be reduced in this way even if the state where the accelerator pedal 6 cannot be returned has occurred, the vehicle can be reliably decelerated and stopped. A throttle opening control according to this embodiment is described below.

Figure 3:
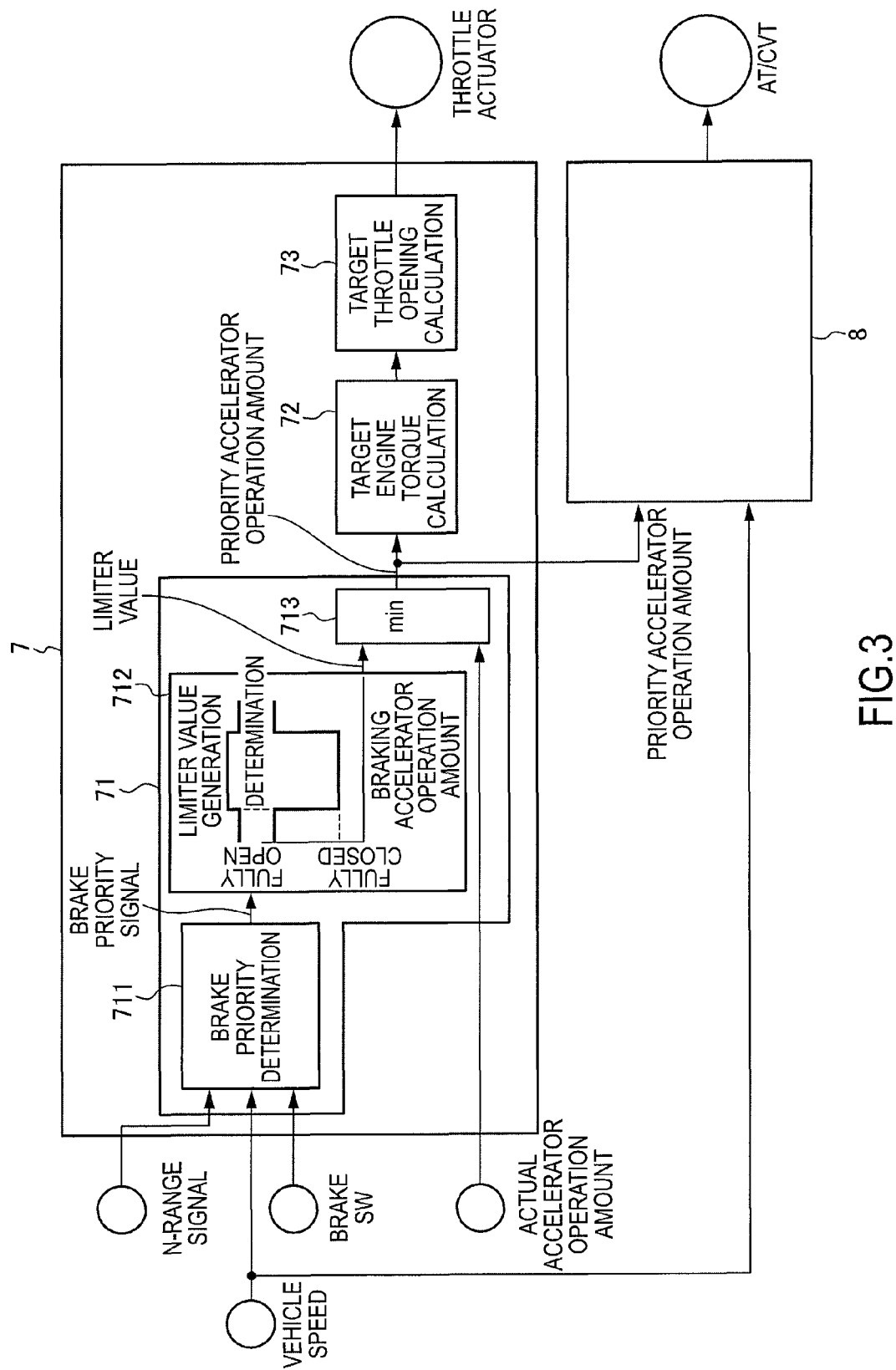
FIG. 3 is a block diagram showing a throttle opening control according to a first embodiment.

FIG. 3 is a block diagram showing the throttle opening control according to this embodiment.

As shown in FIG. 3, a throttle opening control unit 7 includes a brake priority control unit 71, a target engine torque calculation unit 72 and a target throttle opening calculation unit 73. The throttle opening control unit 7 calculates a target engine torque based on a priority accelerator operation amount output from the brake priority control unit 71, and controls the throttle valve to have a target throttle opening which realizes that target engine torque. Each constituent unit is described in detail below.

The brake priority control unit 71 includes a brake priority determination unit 711, a limiter value output unit 712 and a priority accelerator operation amount output unit 713. More detailed processing contents of the brake priority control unit 71 are described later with reference to FIG. 4.

An N-range signal output from the shift position detection sensor 54, a vehicle speed and a brake switch signal are input to the brake priority determination unit 711. The brake priority determination unit 711 determines whether or not to provide an upper limit to the priority accelerator operation amount based on these input signals and outputs a brake priority signal which is switched on when the upper limit is provided.

The brake priority signal is input to the limiter value output unit 712. The limiter value output unit 712 outputs an accelerator operation amount when the accelerator pedal 6 is depressed to the end (hereinafter, referred to as a "maximum accelerator operation amount") as a limiter value if the brake priority signal is off. On the other hand, if the brake priority signal is on, a predetermined accelerator operation amount, with which the vehicle can be decelerated if a braking force by the disc brakes 42 is applied (hereinafter, referred to as a "braking accelerator operation amount"), is output as a limiter value.

The actual accelerator operation amount and the limiter value are input to the priority accelerator operation amount output unit 713. The priority accelerator operation amount output unit 713 compares the actual accelerator operation amount and the limiter value and outputs the one having a smaller value as the priority accelerator operation amount.

In this way, the brake priority control unit 71 restricts the upper limit of the priority accelerator operation amount to be output to the braking accelerator operation amount if the brake priority signal is on. That is, if the actual accelerator operation amount is smaller than the braking accelerator operation amount, the actual accelerator operation amount is output as the priority accelerator operation amount. Conversely, if the actual accelerator operation amount is larger than the braking accelerator operation amount, the braking accelerator operation amount is output as the priority accelerator operation amount.

On the other hand, if the brake priority signal is off, the actual accelerator operation amount is output as the priority accelerator operation amount without restricting the upper limit of the priority accelerator operation amount to be output.

The priority accelerator operation amount is input to the target engine torque calculation unit 72. The target engine torque calculation unit 72 calculates a target engine torque by applying various corrections after the priority accelerator operation amount is converted into an engine torque.

The target engine torque is input to the target throttle opening calculation unit 73. The target throttle opening calculation unit 73 calculates a target throttle opening based on the target engine torque.

The throttle actuator 27 is so controlled that the throttle opening becomes the target throttle opening.

Further, the priority accelerator operation amount is input to a shift control unit 8. The shift control unit 8 includes a shift map to shift a gear position of a transmission and shifts the gear position of the transmission based on the priority accelerator operation amount and the vehicle speed.

Figure 4:
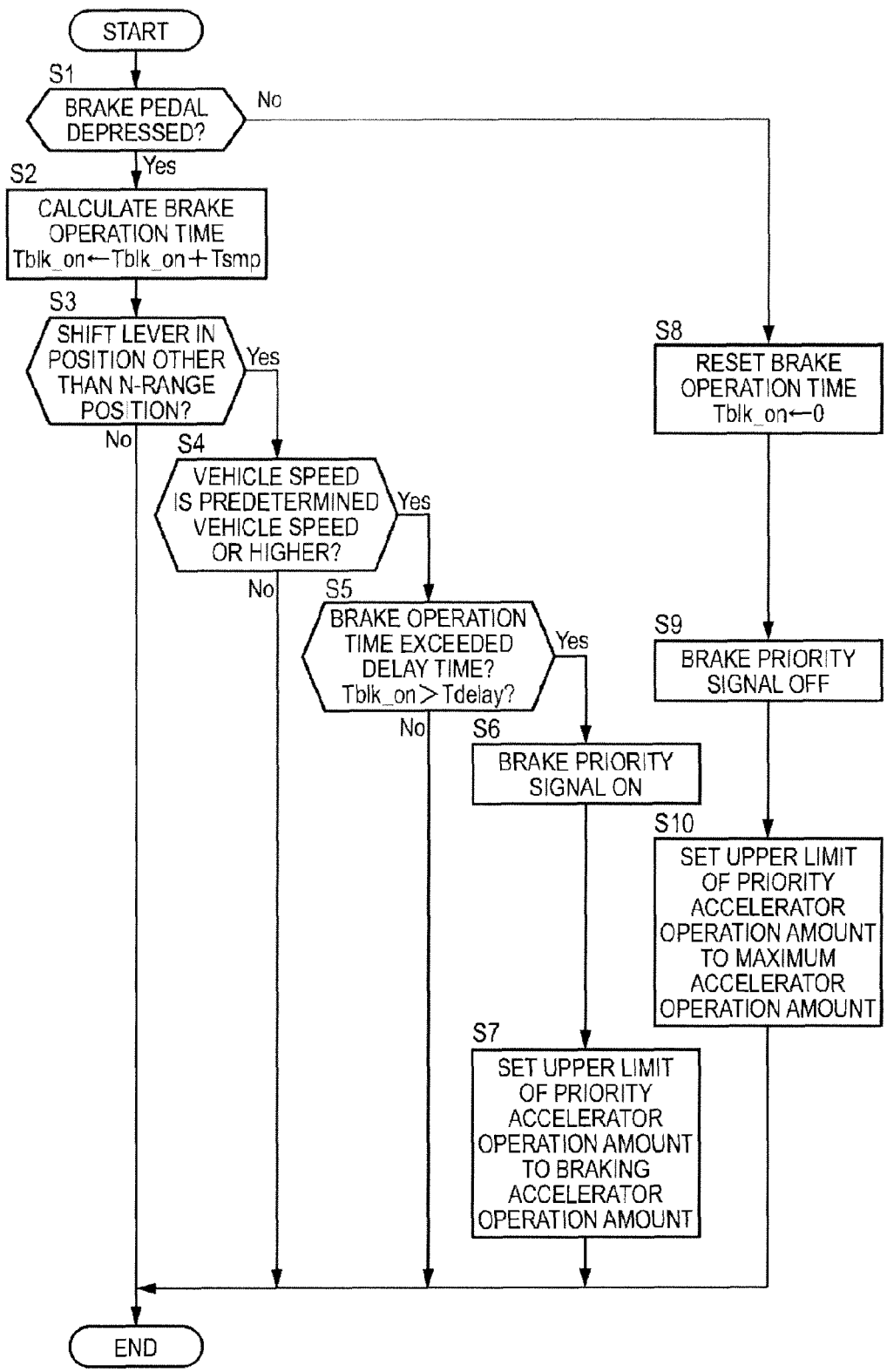
FIG. 4 is a flow chart showing processing contents of a brake priority determination unit according to the first embodiment.

FIG. 4 is a flow chart showing processing contents of the brake priority control unit 71. The controller 5 repeatedly executes this routine in a predetermined computing cycle Tsmp (e.g. 10 ms).

In Step S1, the controller 5 determines whether or not the brake pedal 43 is depressed. Specifically, whether or not the brake switch signal is on is determined. The controller 5 transfers the process to Step S2 if the brake switch signal is on. On the other hand, the process is transferred to Step S8 if the brake pedal 43 is not depressed and the brake switch signal is kept off.

Steps S2 to S7 are processing performed when the brake pedal 43 is depressed.

In Step S2, the controller 5 calculates a time Tblk_on after the brake pedal 43 is depressed (hereinafter, referred to as a "brake operation time"). Specifically, the value of the brake operation time Tblk_on is updated by adding the computing cycle Tsmp to the last brake operation time Tblk_on.

In Steps S3 to S5, the controller 5 determines whether or not conditions to switch the brake priority signal on when the brake pedal 43 is depressed hold. Specific processing content of each Step is described.

In Step S3, the controller 5 determines whether or not the shift lever is located in a position other than an N-range position. Specifically, whether or not an N-range signal, which is on when the shift lever is in the N-range position, is on is determined. This is because it is not necessary to limit the engine torque if the shift lever is in the N-range position since power of the engine 1 is not transmitted to a drive system. The controller 5 transfers the process to Step S4 if the N-range signal is off (i.e. if the shift lever is in a D-range position or the like). On the other hand, the process this time is finished if the N-range signal is on.

In Step S4, the controller 5 determines whether or not the vehicle speed is a predetermined vehicle speed (e.g. 4 km/h) or higher. The controller 5 transfers the process to Step S5 if the vehicle speed is the predetermined vehicle speed or higher. On the other hand, the process this time is finished if the vehicle speed is below the predetermined vehicle speed.

In Step S5, the controller 5 determines whether or not the brake operation time Tblk_on is longer than a predetermined delay time Tdelay. That is, whether the predetermined delay time Tdelay has elapsed after the brake pedal 43 is depressed is determined. Although the delay time Tdelay is approximately set at about 4 seconds in this embodiment, it may be arbitrarily changed within the range of several seconds according to the purpose. The controller 5 transfers the process to Step S6 if the brake operation time Tblk_on is longer than the delay time Tdelay. On the other hand, the process this time is finished if the brake operation time Tblk_on is shorter than the delay time Tdelay.

In Step S6, the controller 5 switches the brake priority signal on.

In Step S7, the controller 5 sets the upper limit of the priority accelerator operation amount to the braking accelerator operation amount.

Steps S8 to S10 are processing performed when the brake pedal 43 is released.

In Step S8, the controller 5 resets the brake operation time Tblk_on to an initial value of zero.

In Step S9, the controller 5 switches the brake priority signal off.

In Step S10, the controller 5 sets the upper limit of the priority accelerator operation amount to the maximum accelerator operation amount.

Figure 5:
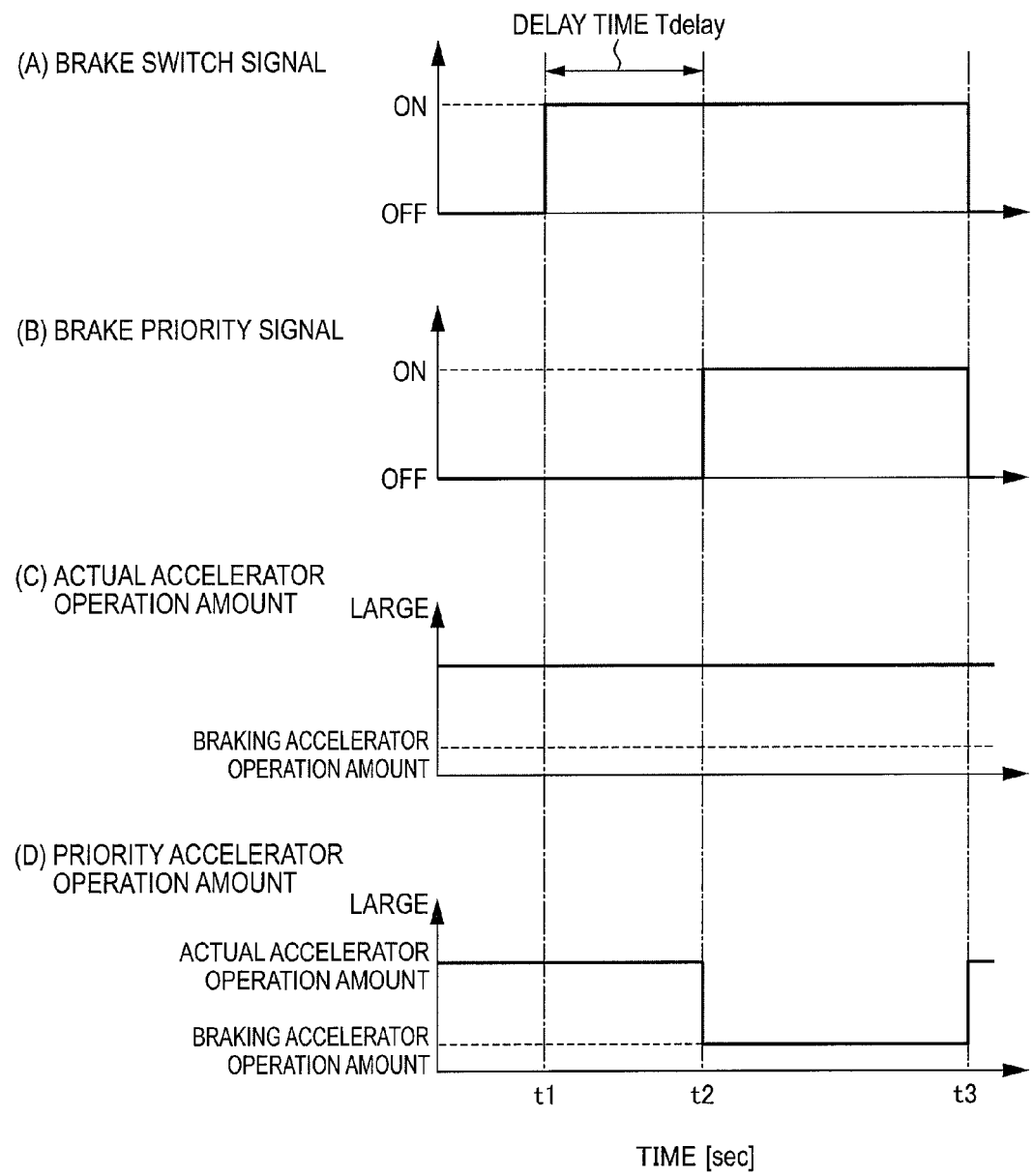
FIG. 5 is a time chart showing processing operations of the brake priority determination unit according to the first embodiment.

FIG. 5 is a time chart showing processing operations of the brake priority control unit 71. To clarify a correspondence with the flow chart, Step numbers of the flow chart are also written. Note that it is assumed that the N-range signal is off and the vehicle speed is the predetermined vehicle speed or higher.

When the brake pedal 43 is depressed at time t1, the brake switch signal is switched on (FIG. 5(A); Yes in S1). At this time, in this embodiment, the brake priority signal is switched on at time t2 reached upon the elapse of the predetermined delay time Tdelay (FIG. 5(B); Yes in S3 to S5, S6), considering that the driver intentionally depresses the brake pedal 43 while depressing the accelerator pedal 6.

When the brake priority signal is switched on at time t2, the upper limit of the priority accelerator operation amount is restricted to the braking accelerator operation amount (S7). Here, since the actual accelerator operation amount is larger than the braking accelerator operation amount, the braking accelerator operation amount is used as the priority accelerator operation amount (FIG. 5(C), (D)).

After time t2, the target engine torque is calculated based on the priority accelerator operation amount whose upper limit is restricted to the braking accelerator operation amount until time t3 at which the brake pedal 43 is released next.

In this way, if the actual accelerator operation amount is larger than the braking accelerator operation amount although the brake priority signal is switched on, the engine torque is controlled to be the target engine torque (braking output) calculated based on the braking accelerator operation amount.

That is, if an engine torque exceeding a braking force by the disc brakes 42 is requested although the brake pedal 43 has been kept depressed for the predetermined delay time Tdelay, this request is judged not to reflect the driver's will, but to be caused by a certain trouble and a reduction is made to an engine torque at which the vehicle can be decelerated and stopped by the braking force by the disc brakes 42.

This enables the vehicle to be reliably decelerated and stopped even if a state where the accelerator pedal 6 cannot be returned occurs by any chance.

According to this embodiment described above, the brake priority signal is kept off and the actual accelerator operation amount is used as the priority accelerator operation amount until the brake operation time Tblk_on exceeds the delay time Tdelay. Then, the target engine torque is calculated based on the actual accelerator operation amount and the engine torque is controlled to be the target engine torque.

Thus, until the brake operation time Tblk_on exceeds the delay time Tdelay, the engine torque as requested by the driver corresponding to the actual accelerator operation amount is obtained. In this way, a feeling of deceleration more than anticipated is not given to the driver and the deterioration of driving performance can be suppressed when the accelerator pedal 6 and the brake pedal 43 are depressed by the driver's will such as at the time of sports driving or in the case of finely adjusting the speed.

On the other hand, after the brake operation time Tblk_on exceeds the delay time Tdelay, the brake priority signal is switched on and the upper limit of the priority accelerator operation amount is restricted to the braking accelerator operation amount. That is, if the actual accelerator operation amount is smaller than the braking accelerator operation amount, the target engine torque is calculated based on the actual accelerator operation amount and the engine torque is controlled to be the target engine torque. Conversely, if the actual accelerator operation amount is not smaller than the braking accelerator operation amount, the target engine torque is calculated based on the braking accelerator operation amount and the engine torque is controlled to set the target engine torque.

In this way, if the accelerator pedal 6 is kept depressed by the braking accelerator operation amount or more although the brake pedal 43 is kept depressed for the predetermined delay time Tdelay, a reduction can be made to an engine torque at which the vehicle can be decelerated by the braking force by the disc brakes 42. Thus, even if the accelerator pedal 6 should be kept depressed by the braking accelerator operation amount or more due to a certain trouble, the vehicle can be reliably decelerated and the safety of the driver can be ensured.

Further, since the throttle valve 25 is controlled to the closing side, a negative pressure can be maintained in the intake air collector 26. Thus, an assisting force when the brake pedal 43 is operated can be ensured by the brake booster 40. Since this enables the master cylinder 41 to sufficiently generate a hydraulic pressure when the brake pedal 43 is depressed and enables the brake pads 26 to be firmly pressed against the disc rotors 421, an original braking force of the brake can be generated.

Further, when the shift lever is in the N-range position, the brake priority signal is not switched on even if the brake operation time Tblk_on exceeds the delay time Tdelay.

In this way, the engine torque as requested by the driver corresponding to the actual accelerator operation amount is obtained when the shift lever is in the N-range position and the engine torque is not transmitted to the drive system. Thus, even if the brake pedal 43 is depressed to race the engine 1 to ascertain an engine feeling, the engine rotation speed can be smoothly increased.

Also if the brake operation time Tblk_on exceeds the delay time Tdelay when the vehicle speed is, for example, in a low vehicle speed range below 4 km/h, the brake priority signal is not switched on. This takes into account that the speed is frequently finely adjusted in the low vehicle speed range.

Since the engine torque as requested by the driver corresponding to the actual accelerator operation amount is obtained in the low vehicle speed range in this way, it becomes easier to finely adjust the speed in the low vehicle speed range while the brake pedal 43 is depressed.

Further, after being switched on, the brake priority signal is not returned to the off-state until the brake switch signal is switched off even if the position of the shift lever is changed to the N-range position or the vehicle speed enters the low vehicle speed range.

This prevents the brake priority signal from being switched off even if the vehicle speed enters the low vehicle speed range when the upper limit of the priority accelerator operation amount is restricted to a limiter operation amount. Thus, the vehicle can be prevented from accelerating again. Further, since the brake priority signal is not switched off even if the position of the shift lever is changed to the N-range position, useless racing of the engine 1 can be prevented.

Further, in this embodiment, the gear position of the transmission is shifted based on the priority accelerator operation amount and the vehicle speed. When the priority accelerator operation amount is limited to the braking accelerator operation amount, this is the same state as the state where the accelerator pedal 6 is returned, wherefore upshifting is basically performed. Thus, the vehicle can be more easily decelerated since the drive force of the vehicle can be reduced.

Second Embodiment

Next, a brake priority control according to a second embodiment of the present invention is described. The brake priority control according to this embodiment differs from the first embodiment in that the upper limit of the accelerator operation amount is reduced in a stepwise manner according to the elapse of time after the brake pedal 43 is depressed. The following description is centered on that point of difference. Note that, in the following embodiment, parts having the same functions as in the first embodiment described above are not repeatedly described as appropriate by using the same reference signs.

Figure 6:
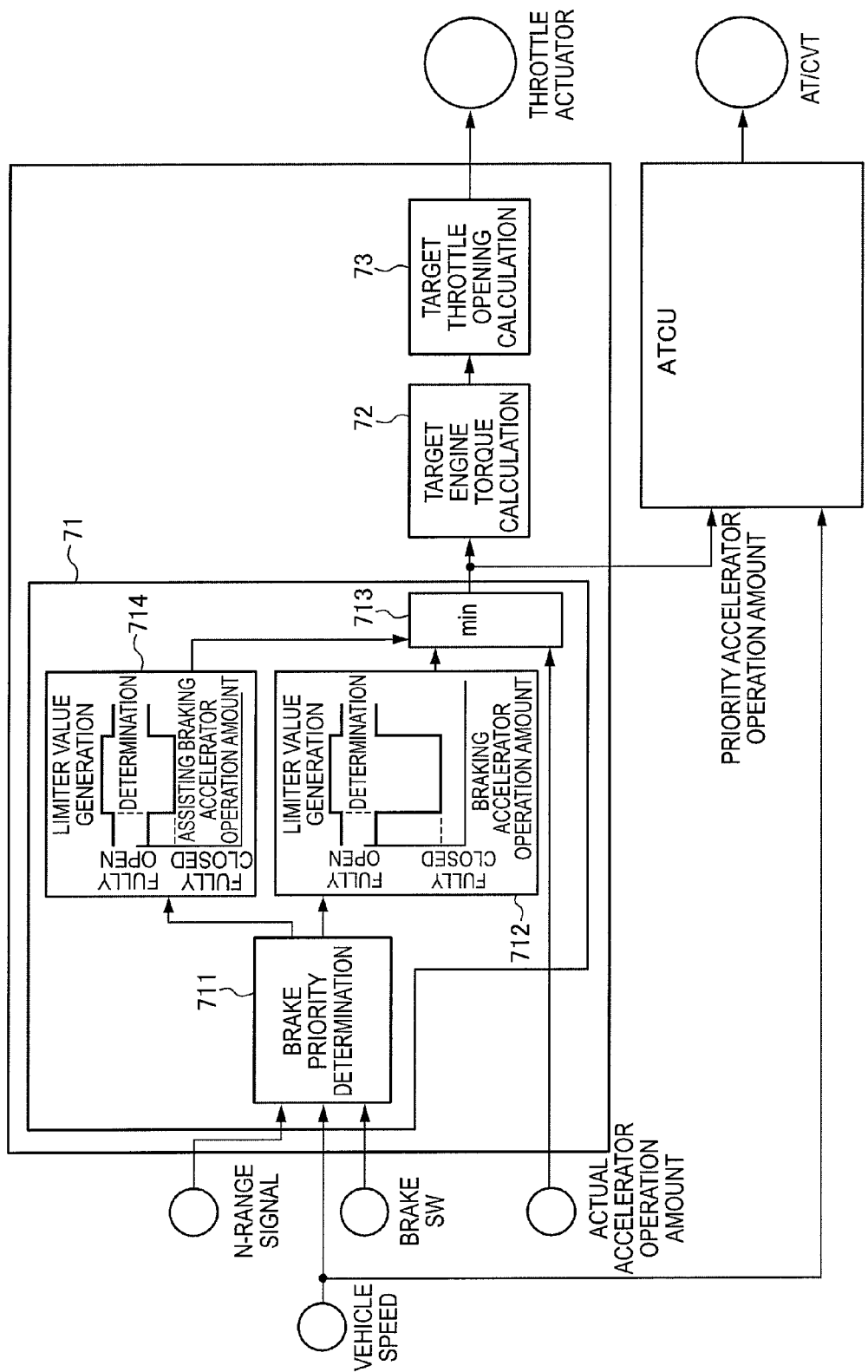
FIG. 6 is a block diagram showing a throttle opening control according to a second embodiment.

FIG. 6 is a block diagram showing a throttle opening control according to this embodiment.

Since only the configuration of a brake priority control unit 71 differs from the first embodiment in this embodiment, the configuration of the brake priority control unit 71 is described below.

The brake priority control unit 71 according to this embodiment includes a brake priority determination unit 711, a first limiter value output unit 712, a second limiter value output unit 714 and a priority accelerator operation amount output unit 713.

An N-range signal, a vehicle speed and a brake switch signal are input to the brake priority determination unit 711. The brake priority determination unit 711 outputs a first brake priority signal and a second brake priority signal based on these input signals.

The first brake priority signal is the same signal as the brake priority signal described in the first embodiment, and is switched on after the elapse of a predetermined delay time Tdelay if the brake switch signal is switched on when an N-range signal and a vehicle speed meet predetermined conditions. The second brake priority signal is a signal which is simultaneously switched on when the brake switch signal is switched on if the N-range signal and the vehicle speed meet the predetermined conditions. Thus, if the brake pedal 43 is depressed when the N-range signal and the vehicle speed meet the predetermined conditions, the second brake priority signal is first switched on and then the first brake priority signal is switched on after the elapse of the delay time Tdelay.

The first brake priority signal is input to the first limiter value output unit 712. The first limiter value output unit 712 outputs a maximum accelerator operation amount as a first limiter value if the brake priority signal is off. On the other hand, if the brake priority signal is on, a braking accelerator operation amount is output as the first limiter value.

The second brake priority signal is input to the second limiter value output unit 714. The second limiter value output unit 714 outputs the maximum accelerator operation amount as a second limiter value if the brake priority signal is off. On the other hand, if the brake priority signal is on, a predetermined assisting braking accelerator operation amount smaller than the maximum accelerator operation amount and larger than the braking accelerator operation amount is output as the second limiter value.

An actual accelerator operation amount, the first limiter value and the second limiter value are input to the priority accelerator operation amount output unit 713. The priority accelerator operation amount output unit 713 compares these input signals and outputs the one having the smallest value as a priority accelerator operation amount.

In this way, the brake priority control unit 71 first restricts the upper limit of the priority accelerator operation amount to the assisting braking accelerator operation amount when the second brake priority signal is switched on. Thereafter, when the first brake priority signal is switched on, the upper limit of the priority accelerator operation amount is reduced to the braking accelerator operation amount.

Figure 7:
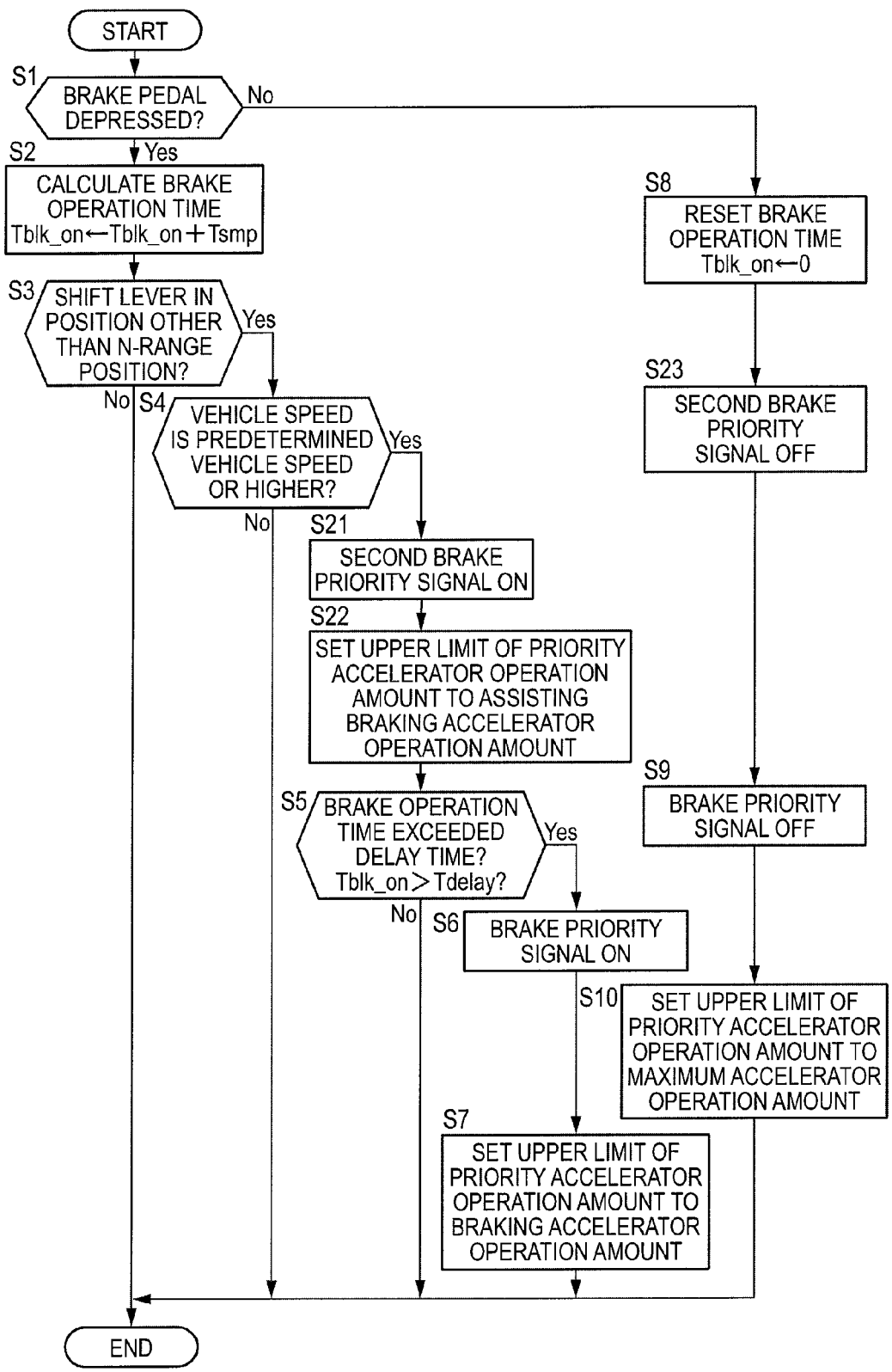
FIG. 7 is a flow chart showing processing contents of a brake priority determination unit according to the second embodiment.

FIG. 7 is a flow chart showing processing contents of the brake priority control unit 71 according to this embodiment. The controller 5 repeatedly executes this routine in a predetermined computing cycle Tsmp (e.g. 10 ms).

First, processing when the brake pedal 43 is depressed, i.e. processings after YES in Step S1 are described. Processing contents of Steps S1 to S7 are not described since being the same as in the first embodiment.

In Step S21, the controller 5 switches the second brake priority signal on.

In Step S22, the upper limit of the priority accelerator operation amount is set to the assisting braking accelerator operation amount.

Next, processings when the brake pedal 43 is released, i.e. processings after NO in Step S1 are described. Processing contents of Steps S8 to S10 are not described since being the same as in the first embodiment.

In Step S23, the controller 5 switches the second brake priority signal off.

Figure 8:
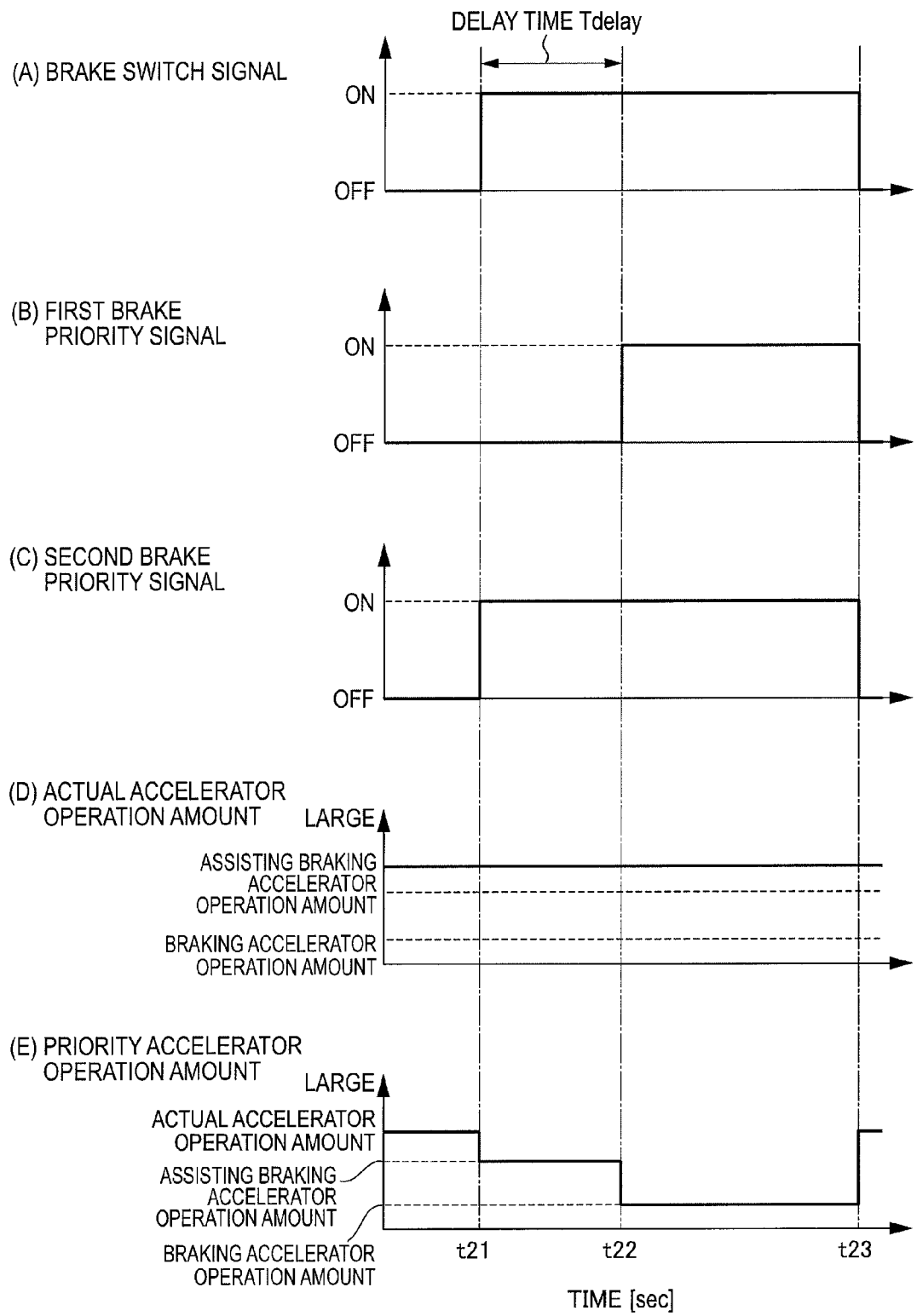
FIG. 8 is a time chart showing processing operations of the brake priority determination unit according to the second embodiment.

FIG. 8 is a time chart showing processing operations of the brake priority control unit 71 according to this embodiment. To clarify a correspondence with the flow chart, Step numbers of the flow chart are also written. Note that it is assumed that the N-range signal is off and the vehicle speed is a predetermined vehicle speed or higher.

When the brake pedal 43 is depressed at time t21, the brake switch signal is switched on (FIG. 8(A); Yes in S1). This causes the second brake priority signal to be switched on (FIG. 8(C); Yes in S3 and S4, S21), and the upper limit of the priority accelerator operation amount is restricted to the assisting braking accelerator operation amount (S22). As a result, a target engine torque is calculated based on the priority accelerator operation amount whose upper limit is restricted to the assisting braking accelerator operation amount until time t22 at which a brake operation time Tblk_on becomes larger than the predetermined delay time Tdelay.

Here, since the actual accelerator operation amount is larger than the assisting limiting accelerator operation amount (FIG. 8(D)), an engine torque is controlled to be the target engine torque (assisting braking output) calculated based on the assisting braking accelerator operation amount (FIG. 8(E)).

When the brake operation time Tblk_on exceeds the delay time Tdelay at time t22, the first brake priority signal is switched on (FIG. 8(B); Yes in S5, S6). Then, the upper limit of the priority accelerator operation amount is reduced to the braking accelerator operation amount (FIG. 8(E); S7). By this, after time t22, the target engine torque is calculated based on the priority accelerator operation amount whose upper limit is restricted to the braking accelerator operation amount until time t23 at which the brake pedal 43 is released.

As just described, in this embodiment, the upper limit of the priority accelerator operation amount is restricted to the assisting braking accelerator operation amount until the delay time Tdelay elapses and a more relaxed output limitation than the one after the elapse of the delay time Tdelay is made when the brake pedal 43 is depressed.

This is to prioritize safety when a state where the accelerator pedal 6 cannot be returned occurs by any chance since it cannot be generally judged that the state where the accelerator pedal 6 cannot be returned has occurred even if the accelerator pedal 6 and the brake pedal 43 are both depressed.

That is, by tentatively making a relaxed output limitation at the same time as the brake pedal 43 is depressed, the vehicle can be decelerated and stopped earlier than in the first embodiment when the state where the accelerator pedal 6 cannot be returned occurs by any chance. Further, since the output limitation is more relaxed than the one made to completely brake the vehicle, the deterioration of driving performance can be suppressed to a minimum level.

According to this embodiment described above, in addition to the same effects as those of the first embodiment, the upper limit of the priority accelerator operation amount is temporarily restricted to the assisting braking accelerator operation amount at the same time as the brake pedal 43 is depressed. Then, when the delay time Tdelay elapses after the brake pedal 43 is depressed, the upper limit of the priority accelerator operation amount is reduced to the braking accelerator operation amount.

Since this causes a relaxed output limitation to be made at the same time as the brake pedal 43 is depressed, the vehicle can be decelerated and stopped earlier than in the first embodiment when the state where the accelerator pedal 6 cannot be returned occurs by any chance.

Third Embodiment

Next, a brake priority control according to a third embodiment of the present invention is described. The brake priority control according to this embodiment differs from the first embodiment in that the upper limit of the priority accelerator operation amount is restricted to the braking accelerator operation amount at the same time as the brake pedal 43 is depressed when the brake pedal 43 is repeatedly depressed. The following description is centered on that point of difference.

When a state where the accelerator pedal 6 cannot be returned occurs and an actual accelerator operation amount is larger than a braking accelerator operation amount, the vehicle cannot be decelerated even if the brake pedal 43 is depressed since the engine 1 outputs a torque exceeding a braking force. Further, since a throttle opening is also large in such a situation, a pressure in the intake air collector 26 approaches an atmospheric pressure. Then, an assisting force by the brake booster 40 is reduced and braking itself works poorly, wherefore it becomes further difficult to decelerate the vehicle.

If the vehicle cannot be decelerated in this way even when the brake pedal 43 is depressed, a driver may repeatedly depress the brake pedal 43. Then, the brake pedal 43 is released before the delay time Tdelay elapses after the brake pedal 43 is depressed, wherefore the priority accelerator operation amount may not be able to be limited to the braking accelerator operation amount.

Accordingly, in this embodiment, the brake priority signal is switched on and the priority accelerator operation amount is limited to the braking accelerator operation amount even before the delay time Tdelay elapses when it is determined that the brake pedal 43 is repeatedly depressed. A brake priority control according to this embodiment is described below.

Figure 9:
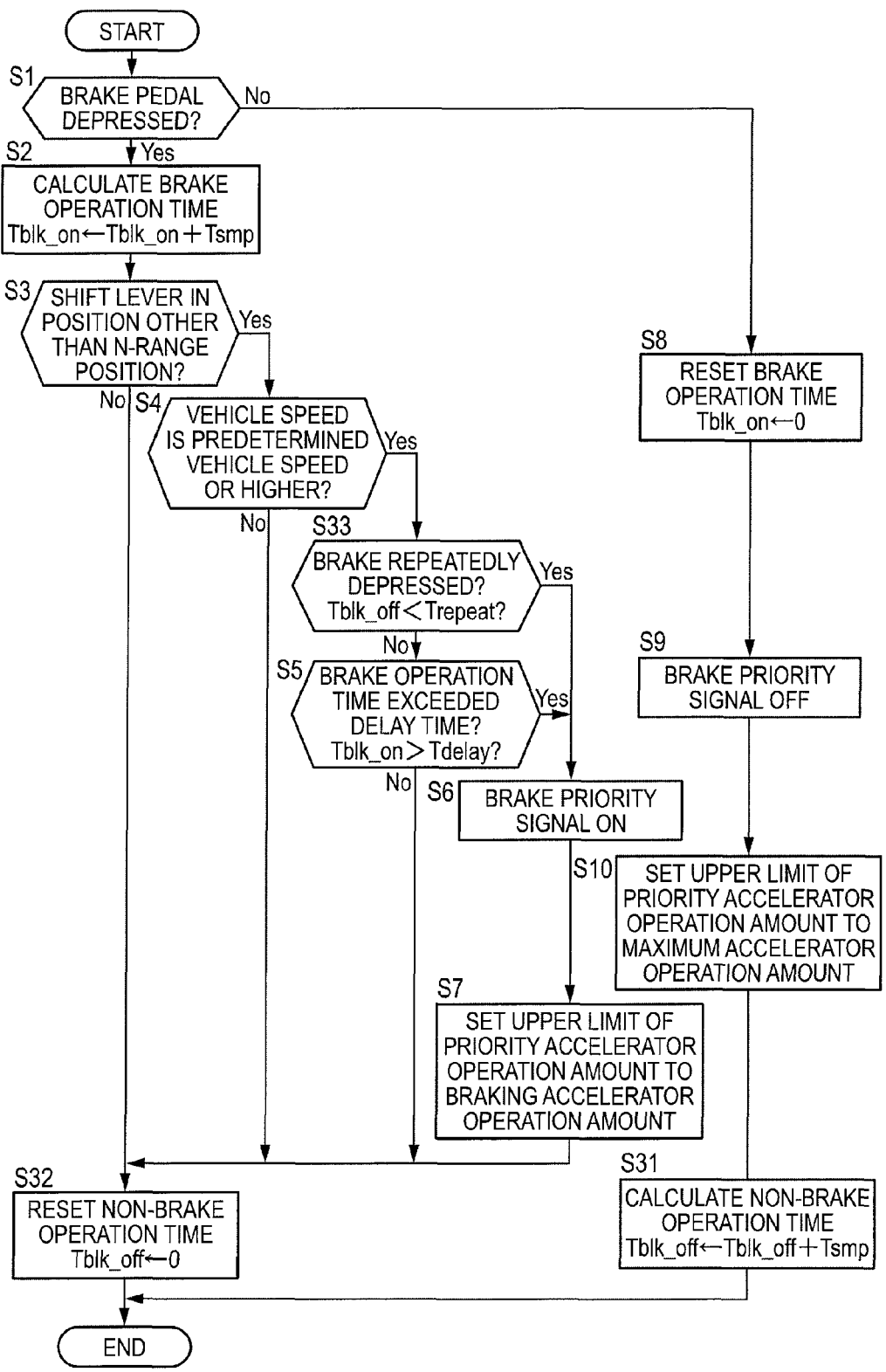
FIG. 9 is a flow chart showing processing contents of a brake priority determination unit according to the third embodiment.

FIG. 9 is a flow chart showing processing contents of a brake priority control unit 71 according to this embodiment. The controller 5 repeatedly executes this routine in a predetermined computing cycle Tsmp (e.g. 10 ms).

First, processing when the brake pedal 43 is released, i.e. processings after NO in Step S1 are described. Processing contents of Steps S8 to S10 are not described since being the same as in the first embodiment.

In Step S31, the controller 5 calculates an elapsed time Tblk_off after the brake pedal 43 is released (hereinafter, referred to as a "non-brake operation time"). Specifically, the value of the non-brake operation time Tblk_off is updated by adding the computing cycle Tsmp to the last non-brake operation time Tblk_off.

Next, processing when the brake pedal 43 is depressed, i.e. processing after YES in Step S1 are described. Processing contents of Steps S2 to S7 are not described since being the same as in the first embodiment.

In Step S32, the controller 5 resets the non-brake operation time Tblk_off to an initial value of zero.

In Step S33, the controller 5 determines whether or not the brake pedal 43 is repeatedly depressed. In this embodiment, the brake pedal 43 is determined to be repeatedly depressed when the brake pedal 43 is depressed again before a predetermined repeat determination time Trepeat elapses after the brake pedal 43 is released. Specifically, whether or not the non-brake operation time Tblk_off is shorter than the repeat determination time Trepeat is determined. The repeat determination time Trepeat may be arbitrarily set within the range of several seconds according to the purpose. The controller 5 transfers the process to Step S6 if the brake pedal 43 is repeatedly depressed. On the other hand, the process is transferred to Step S5 unless the brake pedal 43 is repeatedly depressed.

Figure 10:
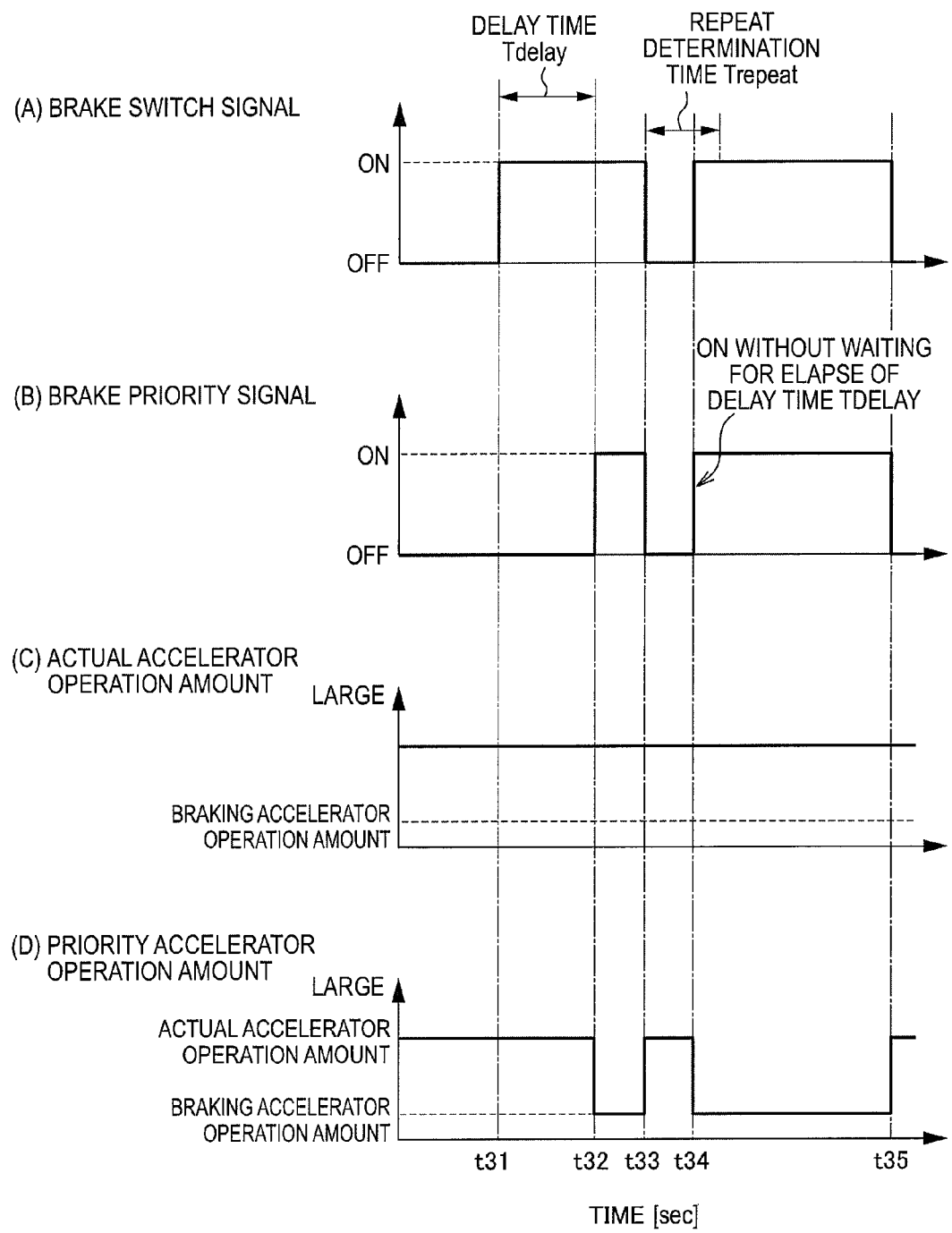
FIG. 10 is a time chart showing processing operations of the brake priority determination unit according to the third embodiment.

FIG. 10 is a time chart showing processing operations of the brake priority control unit 71 according to this embodiment. To clarify a correspondence with the flow chart, Step numbers of the flow chart are also written. Note that it is assumed that an N-range signal is off and a vehicle speed is a predetermined vehicle speed or higher.

When the brake pedal 43 is depressed and the brake switch signal is switched on at time t31 (FIG. 10(A); Yes in S1), the brake priority signal is switched on at time t32 reached upon the elapse of a delay time Tdelay (FIG. 10(B); Yes in S3 and S4, No in S33, Yes in S5, S6).

When the brake priority signal is switched on at time t32, since the actual accelerator operation amount is larger than the braking accelerator operation amount, the upper limit of the priority accelerator operation amount is restricted to the braking accelerator operation amount (FIG. 10(C), (D); S7).

When the brake pedal 43 is released and the brake switch signal is switched off at time t33 (FIG. 10(A); No in S1), the brake priority signal is also switched off (FIG. 10(B); S9).

When the brake pedal 43 is depressed again at time t34 (FIG. 10(A); Yes in S1) before the repeat determination time Trepeat elapses, it is determined that the brake pedal 43 is repeatedly depressed and the brake priority signal is immediately switched on without waiting for the elapse of the delay time Tdelay (FIG. 10(B); Yes in S3, S4, Yes in S33, S6). This causes the upper limit of the priority accelerator operation amount to be restricted to the braking accelerator operation amount at the same time as the brake pedal 43 is depressed (FIG. 10(D); S7).

According to this embodiment described above, in addition to the same effects as those of the first embodiment, the upper limit of the priority accelerator operation amount is restricted to the braking accelerator operation amount at the same time as the brake pedal 43 is depressed when it is determined that the brake pedal 43 is repeatedly depressed.

In this way, even if the state where the accelerator pedal 6 cannot be returned occurs by any chance and the brake pedal 43 is repeatedly depressed, the vehicle can be reliably decelerated and stopped.

Fourth Embodiment

Next, a brake priority control according to a fourth embodiment of the present invention is described. The brake priority control according to this embodiment differs from the third embodiment in that the brake priority signal is switched off after the elapse of a predetermined limitation keeping time Tkeep after the brake pedal 43 is released when the brake pedal 43 is repeatedly depressed. The following description is centered on that point of difference.

As described in the third embodiment, the brake pedal 43 is often repeatedly depressed when the vehicle cannot be sufficiently decelerated although it is desired to decelerate the vehicle. However, if the brake priority signal is switched off at the same time as the brake pedal 43 is released, the priority accelerator operation amount cannot be limited to the braking accelerator operation amount until the brake pedal 43 is depressed next. This is against a driver's will to decelerate the vehicle.

Accordingly, in this embodiment, the upper limit of the priority accelerator operation amount is kept at the braking accelerator operation amount also until the brake pedal 43 is depressed next by switching the brake priority signal off after the elapse of the predetermined limitation keeping time Tkeep after the brake pedal 43 is released when the brake pedal 43 is repeatedly depressed. The brake priority control according to this embodiment is described below.

Figure 11:
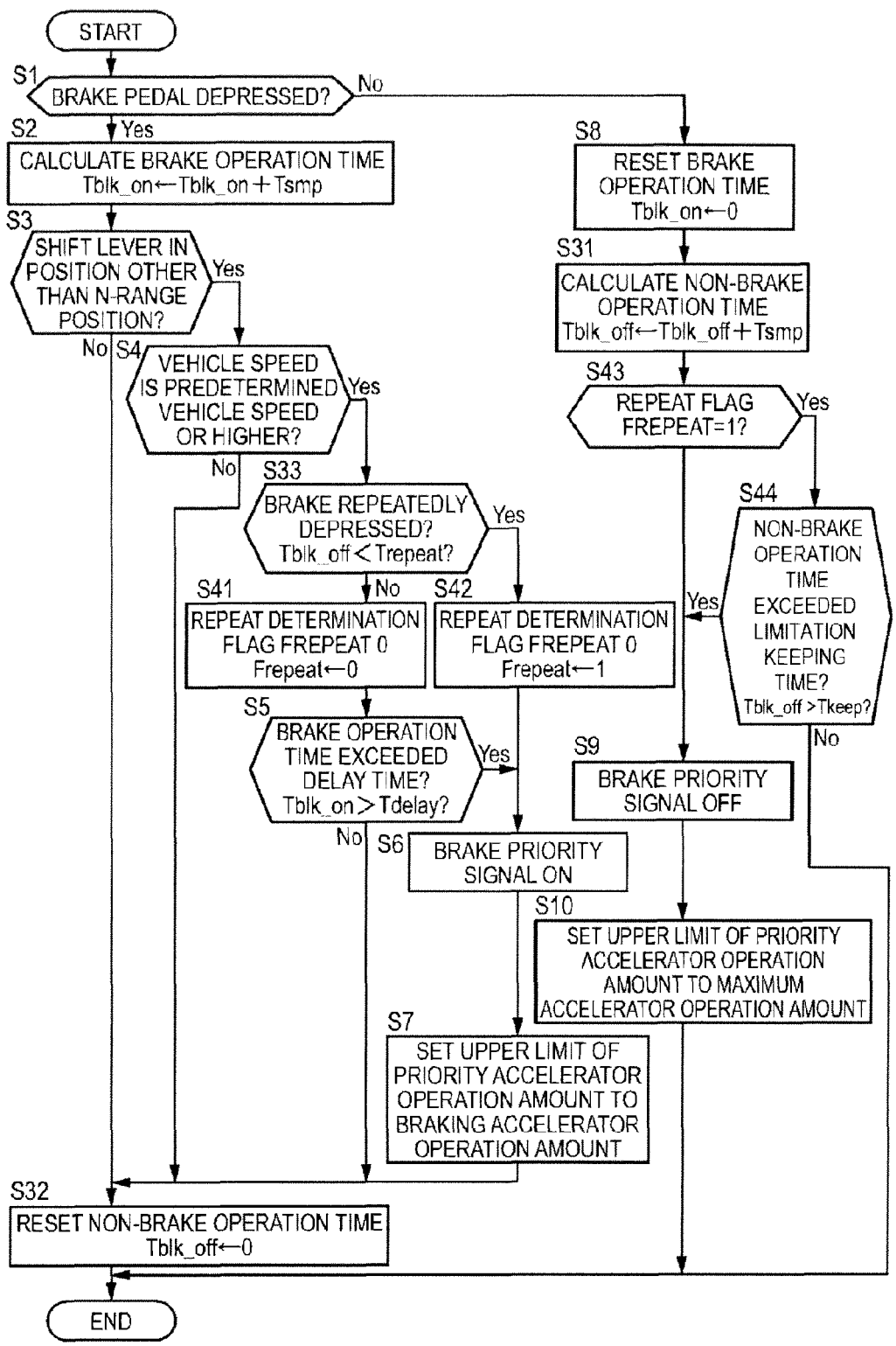
FIG. 11 is a flow chart showing processing contents of a brake priority determination unit according to the fourth embodiment.

FIG. 11 is a flow chart showing processing contents of a brake priority control unit 71 according to this embodiment. The controller 5 repeatedly executes this routine in a predetermined computing cycle Tsmp (e.g. 10 ms).

First, processing when the brake pedal 43 is depressed, i.e. processing after YES in Step S1 are described. Processing contents of Steps S2 to S7, Step S32 and Step S33 are not described since being the same as in the first and third embodiments.

In Step S41, the controller 5 resets a repeat determination flag Frepeat, which is set at 1 when it is determined that the brake pedal 43 is repeatedly depressed, at 0.

In Step S42, the controller 5 sets the repeat determination flag Frepeat to 1.

Next, processing when the brake pedal 43 is released, i.e. processing after NO in Step S1 are described. Processing contents of Steps S8 to S10 and Step S31 are not described since being the same as in the first and third embodiments.

In Step S43, the controller 5 determines whether or not the repeat determination flag is set at 1. The controller 5 transfers the process to Step S44 if the repeat determination flag is set at 1 while transferring the process to Step S8 if the repeat determination flag is set at 0.

In Step S44, the controller 5 determines whether or not the limitation keeping time Tkeep has elapsed after the brake pedal 43 is released. Specifically, it is determined whether or not a non-brake operation time Tblk_off is longer than the limitation keeping time Tkeep. The limitation keeping time Tkeep may be arbitrarily set within the range of several seconds according to the purpose. The controller 5 transfers the process to Step S9 if the limitation keeping time Tkeep has elapsed after the brake pedal 43 is released. On the other hand, the process this time is finished unless the limitation keeping time Tkeep has elapsed after the brake pedal 43 is released.

Figure 12:
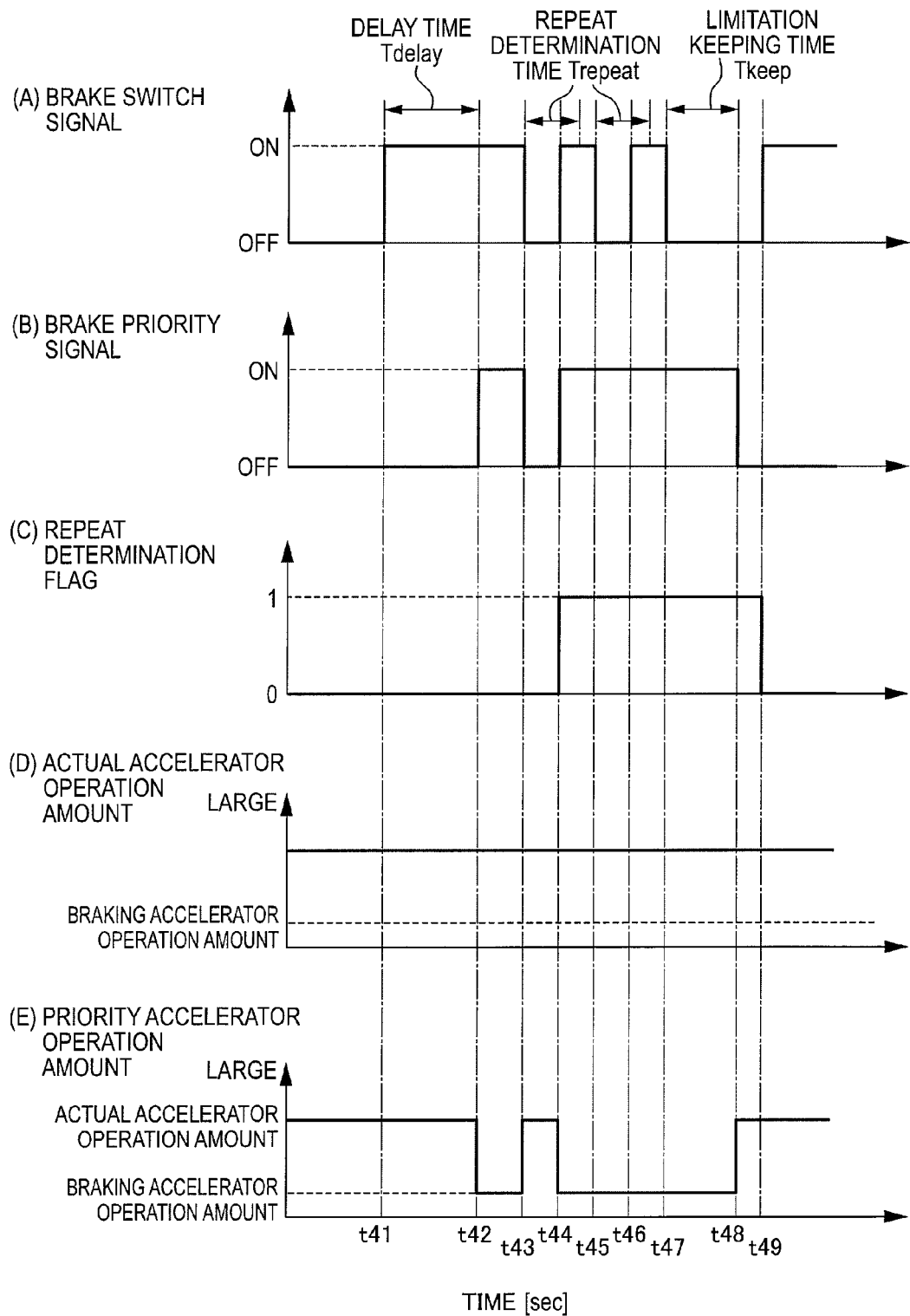
FIG. 12 is a time chart showing processing operations of the brake priority determination unit according to the fourth embodiment.

FIG. 12 is a time chart showing processing operations of the brake priority control unit 71 according to this embodiment. To clarify a correspondence with the flow chart, Step numbers of the flow chart are also written. Note that it is assumed that an N-range signal is off and a vehicle speed is a predetermined vehicle speed or higher.

When the brake pedal 43 is depressed and the brake switch signal is switched on at time t41 (FIG. 12(A); Yes in S1), the brake priority signal is switched on at time t42 reached upon the elapse of the delay time Tdelay (FIG. 12(B); Yes in S3 and S4, No in S33, Yes in S5, S6).

When the brake priority signal is switched on at time t42, since the actual accelerator operation amount is larger than the braking accelerator operation amount, the upper limit of the priority accelerator operation amount is restricted to the braking accelerator operation amount (FIG. 12(D), (E); S7).

When the brake pedal 43 is released at time t43, the brake switch signal is switched off (FIG. 12(A); No in S1). Since the repeat determination flag is set at 0 at this time (FIG. 12(C);

No in S43), the brake priority signal is switched off at the same time as the brake switch signal is switched off (FIG. 12(B); S9).

When the brake pedal 43 is depressed again at time t44 (FIG. 12(A); No in S1) before the elapse of the repeat determination time Trepeat, it is determined that the brake pedal 43 is repeatedly depressed (Yes in S33), the brake priority signal is immediately switched on this time without waiting for the elapse of the delay time Tdelay and the repeat determination flag is set at 1 (FIG. 12(B), (C); S42, S6).

Thus, even if the brake pedal 43 is released and the brake switch signal is switched off at time t45 (FIG. 12(A); No in S1), the repeat determination flag is set at 1 (Yes in S43) and the limitation keeping time Tkeep has not elapsed yet (No in S44), wherefore the brake priority signal is kept on.

Although the brake pedal 43 is depressed again at time t46, the brake priority signal is kept on and the repeat determination flag is kept at 1 (FIG. 12(B), (C); Yes in S1, Yes in S33) since the repeat determination time Trepeat and the delay time Tdelay have not elapsed yet.

When the brake pedal 43 is released at time t47 (No in S1), the brake priority signal is switched off at time t48 reached upon the elapse of the limitation keeping time Tkeep from time t47 (FIG. 12(B); Yes in S43 and S44, S9). Thereafter, when the brake pedal 43 is depressed at time t49, the repeat determination flag is set to 0 (FIG. 12(C); Yes in S1, No in S33).

As just described, in this embodiment, once the repeat determination is made, the brake priority signal is kept on during the repeat determination until the limitation keeping time Tkeep elapses even if the brake pedal 43 is released.

In this way, when the brake pedal 43 is repeatedly depressed, a target engine torque is calculated based on the priority accelerator operation amount whose upper limit is restricted to the braking accelerator operation amount even if the brake pedal 43 is releases.

Accordingly, the vehicle can be reliably decelerated and stopped and the vehicle can be stopped earlier than in the third embodiment even if a state where the accelerator pedal 6 cannot be returned occurs by any chance and the brake pedal 43 is repeatedly depressed.

Although this invention has been described by way of the specific embodiments, this invention is not limited to the above embodiments. It is possible for a person skilled in the art to modify or alter the above embodiments in various manners within the technical scope of the present invention.

For example, although the above embodiments have been described, taking the spark ignition internal combustion engine as an example, there is no limitation to this and, for example, a compression ignition internal combustion engine may be adopted. In that case, a fuel injection amount may be controlled instead of the throttle opening.

Further, although the description has been made, taking the disc brakes 42 as an example, there is no limitation to this and, for example, drum brakes may be adopted.

Further, although the throttle opening is controlled when the engine torque is controlled to the target engine torque, there is no limitation to this. For example, in the case of including a variable valve device capable of continuously changing lift/operating angles of the intake valves 123, the engine torque may be controlled by controlling lift amounts of the intake valves 123 by that variable valve device. Further, the fuel injection amount may also be reduced.

Further, although the output of the internal combustion engine is limited after the brake operation time exceeds the predetermined delay time, there is no limitation to this. For example, the output of the internal combustion engine may be limited after a predetermined distance is driven following a brake operation.

Further, in the case of a vehicle in which a plurality of driving modes can be selected according to a driver's preference, the above brake priority control may be performed in a driving mode with a high possibility that the driver depresses the brake pedal 43 with the left foot, for example, such as when a switch is made to a sport mode.

Although whether or not the upper limit is provided for the priority accelerator operation amount is determined based on the N-range signal, the vehicle speed and the brake switch signal, it may be determined only based on the brake switch signal.

For the above description, the contents of Japanese Patent Application No. 2010-92172 filed on Apr. 13, 2010 are hereby incorporated by reference.

The invention claimed is:

1. An output control device for an internal combustion engine for generating a drive force of a vehicle, comprising:
a braking request detection unit configured to detect whether or not a braking request operation has been performed;
a braking operation time calculation unit configured to calculate a braking operation time from the start of the braking request operation;
an output limitation unit configured to limit an output of the internal combustion engine when the braking operation time becomes longer than a predetermined time;
an output limitation lifting unit configured to lift output limitation of the internal combustion engine when the braking request operation is finished; and
a repeat determining output limitation unit configured to limit the output of the internal combustion engine before the braking operation time becomes longer than the predetermined time when the braking request operation is started again before a repeat determination time elapses after the braking request operation is finished.

2. The output control device for the internal combustion engine according to claim 1, comprising:
a non-braking operation time calculation unit configured to calculate a non-braking operation time until the braking request operation is started next after being finished; and
a repeat determining output limitation lifting unit configured to lift limitation by the repeat determining output limitation unit when the non-braking operation time becomes longer than a predetermined time without bringing an output limitation lift by the output limitation lifting unit into operation when the braking request operation is performed again before the repeat determination time elapses after the braking request operation is finished.

3. The output control device for the internal combustion engine according to claim 1, wherein the output limitation unit and the repeat determining output limitation unit limit the output of the internal combustion engine to a braking output capable of decelerating the vehicle with a braking force generated by the braking request operation.

4. The output control device for the internal combustion engine according to claim 3, wherein the output limitation unit includes an assisting output limitation unit configured to limit the output of the internal combustion engine to an assisting braking output larger than the braking output before the output of the internal combustion engine is limited to the braking output.

5. An output control method for an internal combustion engine for generating a drive force of a vehicle, comprising:
- a braking request detection step of detecting whether or not a braking request operation has been performed;
- a braking operation time calculation step of calculating a braking operation time from the start of the braking request operation;
- an output limitation step of limiting an output of the internal combustion engine when the braking operation time becomes longer than a predetermined time;
- an output limitation lifting step of lifting output limitation of the internal combustion engine when the braking request operation is finished; and
- a repeat determining output limitation step of limiting the output of the internal combustion engine before the braking operation time becomes longer than the predetermined time when the braking request operation is started again before a repeat determination time elapses after the braking request operation is finished.

* * * * *